United States Patent [19]

Orain

[11] 4,338,796
[45] Jul. 13, 1982

[54] SLIDABLE HOMOKINETIC TRIPOD JOINT AND A CORRESPONDING TRANSMISSION HAVING A FLOATING SHAFT

[75] Inventor: Michel A. Orain, Conflans Ste Honorine, France

[73] Assignee: Glaenzer Spicer, Poissy, France

[21] Appl. No.: 133,683

[22] Filed: Mar. 25, 1980

[30] Foreign Application Priority Data

Apr. 4, 1979 [FR] France .................. 79 08452

[51] Int. Cl.³ .......................................... F16D 3/30
[52] U.S. Cl. ................................. 464/111; 464/905
[58] Field of Search ................ 64/21, 17 R, 17 A, 8

[56] References Cited

U.S. PATENT DOCUMENTS

| | | | |
|---|---|---|---|
| 3,818,721 | 6/1974 | Wahlmark | 64/17 R |
| 3,877,251 | 4/1975 | Wahlmark | 64/8 |
| 4,010,625 | 3/1977 | Orain | 64/8 |
| 4,175,407 | 11/1979 | Orain | 64/21 |
| 4,178,778 | 12/1979 | Orain | 64/21 |

Primary Examiner—Ira S. Lazarus
Attorney, Agent, or Firm—Wenderoth, Lind & Ponack

[57] ABSTRACT

In the joint, the raceways of the tulip element have the shape of a torus. The ratio of the maximum distance between the axis of the tulip element and the axis of the tori defining the raceways to the radius of said tori is between ¼ and ¾. This results in a considerably improved mechanical efficiency and consequently in a reduced opposition to sliding.

Application of the joint to automobile vehicle transmissions.

6 Claims, 6 Drawing Figures

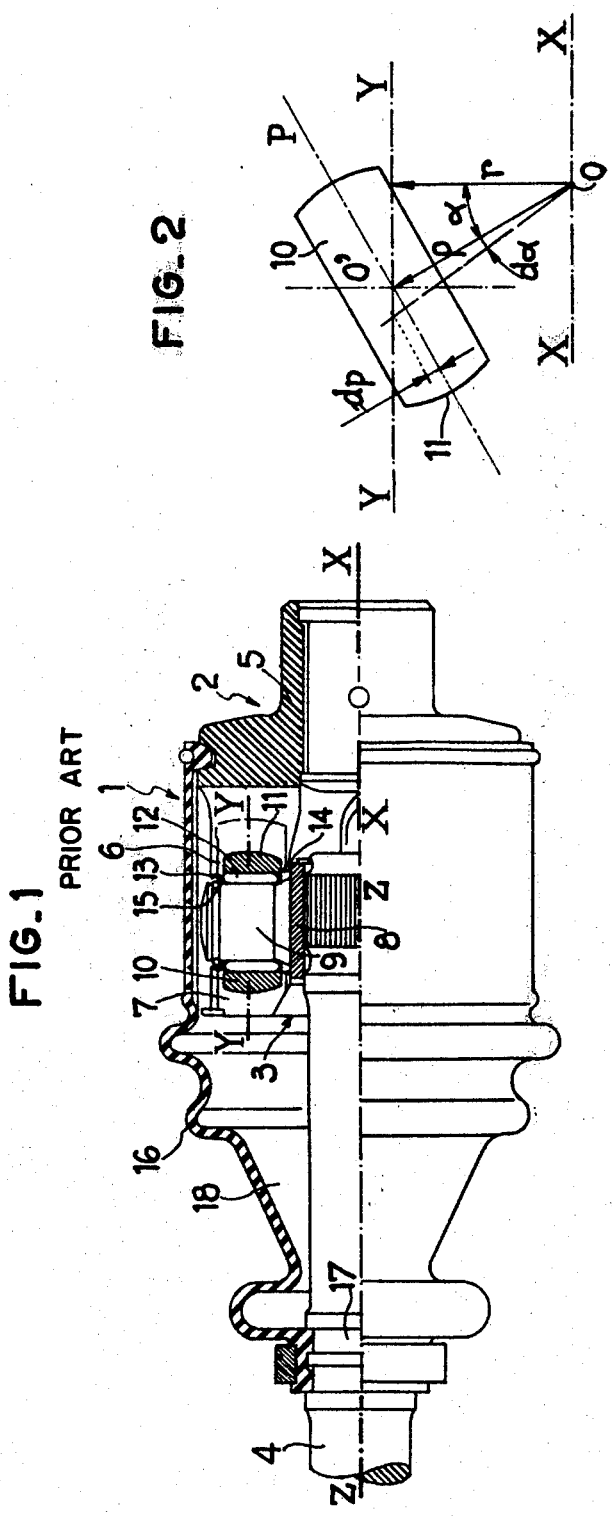

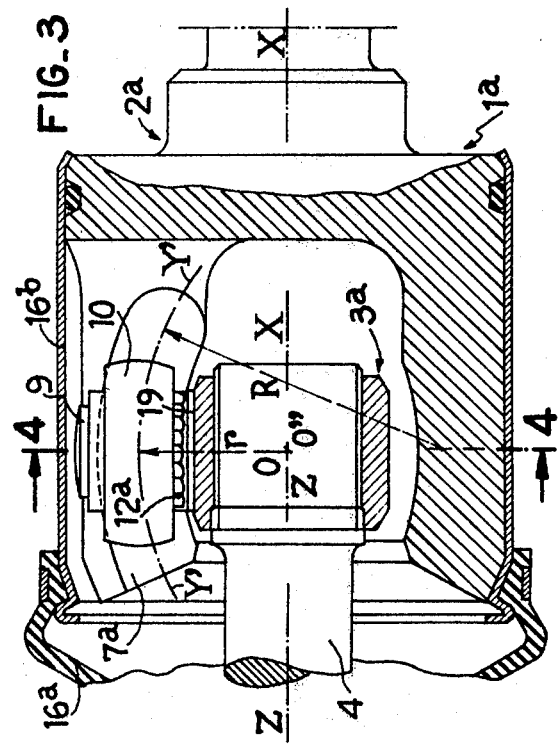
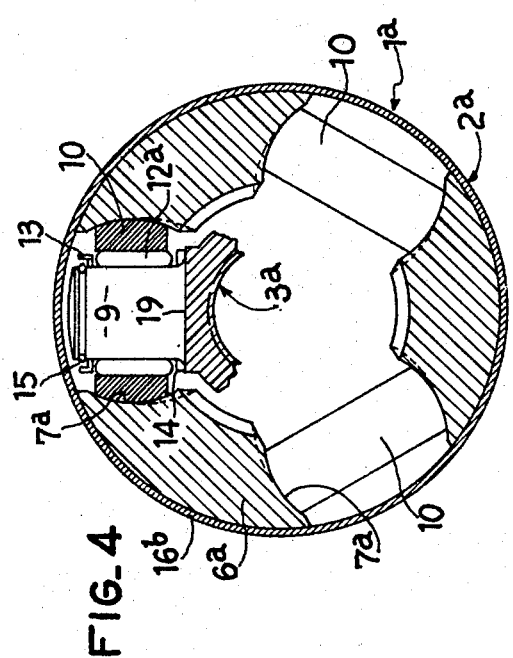
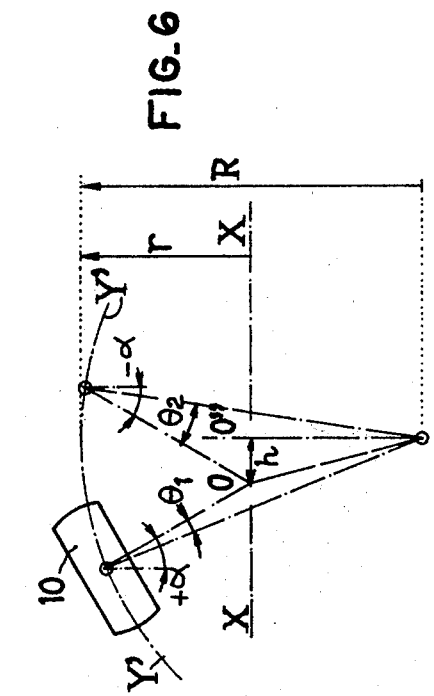
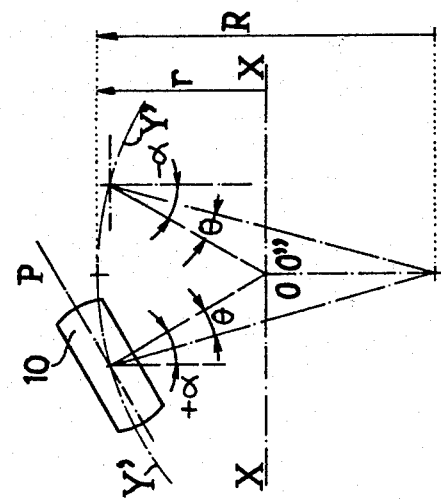

SLIDABLE HOMOKINETIC TRIPOD JOINT AND A CORRESPONDING TRANSMISSION HAVING A FLOATING SHAFT

The present invention relates to slidable homokinetic tripod joints having a moderate operating angle (maximum angle less than about 20°) intended in particular for automobile vehicle transmissions. These joints usually comprise a tulip member which defines three raceways having a part-circular cross-section and a tripod element which is adapted to be fixed to a shaft by means of a cylindrical skirt portion from which extend radially three arms on each of which a part-spherical roller is rotatably and slidably mounted by means of a needle bearing, each roller being received in a raceway and the tripod element being axially free inside the tulip element.

Among slidable homokinetic tjoints, the tripod joints of this type are those which provide the least opposition to the sliding of the transmission shaft under torque. Indeed, in respect of a moderate, small or zero operating angle, the movement of axial extension or compression under torque occurs by the practically pure rolling of the connecting elements which transfer the loads between the driving and driven parts.

This is confirmed by comparative laboratory measurements which show that the tripod joints of the aforementioned type, have, when they are correctly designed, the lowest mechanical loss under torque. This loss is of the order of 5/10,000 in respect of an operating angle of 5° and 2/10,000 in respect of an operating angle of 3°. On the other hand, the same measurements show that the mechanical loss increases rather rapidly with the angle. For example, at an operating angle of 10°, there is a mechanical loss of 25/10,000 and the opposition to sliding becomes correspondingly more marked, and the tripod joint thus loses a part of its advantage over the other types of telescopic joints.

An object of the invention is to provide an improvement which may reduce by about 50% the mechanical loss of these tripod joints which correspondingly facilitates the sliding under torque without alteration in the simplicity and strength of this type of joint.

According to the invention, there is provided a joint of the aforementioned type, wherein the raceways of the tulip element have the shape of a torus, the ratio of the maximum distance between the axis of the tulip element and the axis of the tori defining the raceways to the radius of these torii being between $\frac{1}{4}$ and $\frac{3}{4}$.

Another object of the invention is to provide a transmission comprising a floating shaft interposed between two slidable homokinetic joints, at least one of which is as defined hereinbefore. In this way, a very advantageous self-centering effect on the part of the shaft is achieved in a simple and cheap manner.

Further features and advantages of the invention will be apparent from the ensuing description which is given merely by way of example with reference to the accompanying drawings in which:

FIG. 1 is a half elevational view and half-axial sectional view of a conventional slidable tripod joint;

FIG. 2 is a diagram corresponding to the joint of FIG. 1;

FIG. 3 is an axial sectional view of a joint according to the invention;

FIG. 4 is a diagrammatic sectional view taken on line 4—4 of FIG. 3, and,

FIGS. 5 and 6 are two diagrams similar to that of FIG. 2, but corresponding to the joint of FIGS. 3 and 4.

The homokinetic joint 1, shown in a perfectly aligned position in FIG. 1, comprises mainly a tulip element 2 and a tripod element 3 fixed to the splined end portion of a transmission shaft 4.

The tulip element 2 has a stem portion 5 which has an axis X—X and is internally splined. Extending from this stem portion are three petal portions 6, whose confronting longitudinal edge portions are machined in such manner as to define between adjacent petal portions raceways 7 which have a part-circular cross-sectional shape, these raceways being equally angularly spaced apart. The axis Y—Y of each raceway 7 is rectilinear and parallel to the axis X—X.

The tripod element is secured to the shaft 4 by means of an internally splined cylindrical skirt portion 8. Extending radially from the skirt portion are three arms or trunnions 9 having a circular cross-sectional shape. Each arm 9 carries a roller 10 having a part-spherical outer active surface 11. Interposed between the arm 9 and the roller 10 is a ring 12 of adjoining needles which are retained axially by means of a safety device comprising suitable washers 13,14 and a stop ring 15, the latter being received in a groove provided adjacent the end of the arm 9.

The tripod 3 is axially free inside the tulip element 2.

Externally, the tulip element 2 is circular. A fluidtight elastic gaiter 16 is secured adjacent one end thereof to the periphery of the stem portion 5 around the petal portions 6 and then converges to fixing grooves 17 provided on the shaft 4. The gaiter 16 defines with the tulip element 2 a sealed enclosure 18 which retains the lubricant and protects the mechanism.

When the angle $\delta$ that the axis Z—Z of the shaft 4 makes with the axis X—X is small, the axial sliding movement of the tripod element under torque occurs by a pure rolling, on one hand of the bore of the rollers on the trunnions through the needles and, on the other hand, of the part-spherical surface of the rollers on the raceways of the tulip element. It will be understood that, under these conditions, the reciprocating movement of the rollers on their arms 9 resulting from the rotation of the joint at an angle and the general movement of translation of the three rollers resulting from the sliding of the tripod element, occur with no marked opposition, even in respect of a high transmitted torque.

FIG. 2 shows diagrammatically a position of a roller 10 when the joint 1 operates at a given angle $\delta$. The angle $\alpha$ made by the plane P of the roller with the axis Y—Y of the raceway 7 varies from $+\delta$ to $-\delta$ in the course of the rotation of the joint.

The preferential direction of rolling of the roller in the plane P is opposed by the guiding of the raceway 7 which constrains this roller to move along the axis Y—Y, i.e. at an angle of deviation relative to its natural direction of rolling. This deviation corresponds to a lateral sliding of the roller which occurs simultaneously, on one hand, between the part-spherical surface of the roller and the raceway and, on the other hand, between the bore of the roller and its arm 9. As the roller is mounted on needles, its rotation is assumed to be perfectly free on the arm 9. The sliding movement on the raceway can therefore only be contained in a plane containing the axis of the trunnion.

If $\rho$ designates the distance between the centres 0 of the tripod element and 0' of the roller, and r the distance between the axes X—X and Y—Y, $\rho = r/\cos \alpha$, and the expression of the elementary sliding is the following:

$$d\rho = \rho d\alpha \cdot \tan \alpha = r \cdot \tan \alpha \cdot d\alpha / \cos \alpha \qquad (1)$$

The joint 1a according to the invention shown perfectly aligned in FIGS. 3 and 4, only differs essentially from the joint 1 of FIG. 1 in two respects. On one hand, the raceways 7a of the tulip element 2a each have as the central axis Y'—Y' an arc of a circle so that this imparts thereto a torus shape. The radius R of each torus is distinctly larger than the maximum value r of the distance between the axis X—X and the arc Y'—Y'. As a result of this construction, the free axial sliding of the tripod element 3a in the tulip element is accompanied by, irrespective of the angle between the axis Z—Z and the axis X—X, a sliding of the rollers on their arms. In order to permit this sliding of the rollers on their arms which is increased relative to the known construction of FIG. 1, the needles 12a have a length which exceeds the length of the rollers and this constitutes the second difference between the joints 1 and 1a.

It may also be noted that, in the illustrated arrangement, the gaiter 16a is fixed to a cylindrical hood 16b which surrounds the petal portions 6a of the tulip element 3a at the open end of the latter.

FIG. 5 shows diagrammatically a position of a roller 10 when the centre 0 of the tripod element is in its mean axial position, at the point 0'' of the axis X—X which corresponds to the maximum distance r defined above, as in the case in FIG. 3, and when the joint 1a operates at an angle.

FIG. 6 is a similar diagram but which corresponds to an offset h along the axis X—X between the points 0 and 0''.

The angle $\theta$ made by the plane P of the roller with the tangent to the circular axis Y'—Y' of the torus raceway 7a is smaller than $\alpha$. This angle $\theta$ may be defined simply with good approximation, by the following relation:

$$\tan \theta = (1 - r/R) \cdot \tan \alpha - h/R \qquad (2)$$

The elementary sliding corresponding to an increase $d\alpha$ of the angle $\alpha$, is given by an expression of similar form to the relation (1):

$$d\rho_t = \rho \cdot d\alpha \cdot \tan \theta = r/\cos \alpha \cdot d\alpha \cdot [(1 - r/R) \cdot \tan \alpha - h/R] \qquad (3)$$

It will be observed that we have again exactly the relation (1) if R is made equal to $\infty$, which is correct, since the rectilinear raceways 7 may be considered to be tori having an infinite radius of curvature.

If h=0 (FIG. 5), the ratio of the elementary sliding $d\rho_t$ of the joint according to the invention to the elementary sliding $d\rho$ of the known joint of FIG. 1 is written:

$$\frac{d\rho_t}{d\rho} = \frac{\frac{r}{\cos \alpha} \cdot \left(1 - \frac{r}{R}\right) \cdot \tan \alpha \cdot d\alpha}{\frac{r}{\cos \alpha} \cdot \tan \alpha \cdot d\alpha} = 1 - \frac{r}{R} \qquad (4)$$

When $h \neq 0$, and assuming the roller to be at an angle $\alpha$ and at an angle $-\alpha$, only the mean $\theta_m$ of the absolute values of the corresponding angles $\theta_1$ and $\theta_2$ is significant for the losses by sliding. It can be shown that:

$$\tan \theta = |(1 - r/R) \cdot \tan \alpha|$$

By comparing this relation with the relations (2) and (3), it can be seen that the mechanical losses have the same value as for h=0, i.e. that the relation (4) remains variable.

Thus the mechanical loss is improved in the ratio $1 - r/R$. In other words, the elementary sliding work, and consequently also the elementary mechanical loss, which is proportional to this work, may be, for any angle $\alpha$, very much smaller with the joint 1a of the invention. Consequently, there is an easy sliding of each roller when the joint operates at an angle, and consequently an improved isolation of the compartment of the vehicle from the engine unit, which generates vibrations, and less sensitivity to friction and, consequently, a much improved comfort, in particular for large operating angles.

For example, in respect of a ratio $r/R = \frac{1}{2}$, there is obtained $d\rho_t/d\rho = \frac{1}{2}$. The opposition to the displacement of the roller in its raceway is then reduced by about 50% with as a direct consequence, a very important gain in respect of the freedom of sliding under torque, and therefore a much improved comfort. The ratio r/R could theoretically be increased to 1 and, under this condition, the mechanical loss would be practically zero. However, beyond a certain value, the opposition to the sliding has no longer any harmful effect and, moreover, by increasing the ratio r/R to 1, the possibility of an axial sliding of the proposed joint would be reduced considerably. This is why, according to the applications, and bearing in mind the value of the working angle which is the most frequent and of the required axial sliding length for the tripod element, the ratio r/R would generally be between $\frac{1}{4}$ and $\frac{3}{4}$.

Other advantages result from this improvement of the slidable tripod joint.

When two slidable tripod joints of known type shown in FIG. 1 are mounted at the ends of a floating transmission shaft, the shaft naturally reaches an end-of-travel contact inside one of the tripod joints and creates axial shocks due to the vibrations of the driving and driven elements. In contrast to this, with one of two joints 1a having torus raceways, the floating shaft has a tendency to centre itself axially and to conserve equal clearances at each of its ends and avoids abutment.

Further, when the tripod element becomes axialy off centre, the rollers 10 move toward the centre of the tripod element, at the same time as the distance h increases, until they abut against the shoulder 19 of the arms 9 which limit the sliding of these rollers in the inner direction. This feature may be employed advantageously for acting as a safety axial retention; the release of the rollers from the end of the petal portions of the tulip element can thus be avoided without any additional retaining means being required, and consequently simply and cheaply. It is sufficient for this purpose that the length of the raceway 7a be such that, when the joint 1a extends, the rollers 10 abut against the shoulders 9 before reaching the open end of these raceways.

In this case, in order to avoid a sound producing contact of the rollers against the shoulders 19 of the tripod element, an elastically yieldable washer of the corrugated Belleville type, or an elastomeric ring, may be interposed between each roller and the associated shoulder. Also, there may be placed in this region a corrugated circlip which may be mounted inside the tulip element after assembly of the tripod element. Such a shock absorbing means has not been shown in the drawings.

Having now described my invention, what I claim as new and desire to secure by Letters Patent is:

1. A slidable homokinetic tripod joint comprising a tulip element which defines three raceways having a part-circular cross-sectional shape, a tripod element which has a cylindrical skirt portion for fixing the tripod element to a shaft and three arms which extend radially from the skirt portion, three part-spherical rollers which are respectively freely rotatably and slidably mounted on the three arms, and a needle bearing interposed between each roller and the respective arm, each roller being received in a respective raceway of said raceways and the tripod element being axially free inside the tulip element, the raceways of the tulip element having the shape of a torus and the ratio of the maximum distance between the axis of the tulip element and the axis of the tori defining the raceways to the radius of said tori being between $\frac{1}{4}$ and $\frac{3}{4}$.

2. A joint as claimed in claim 1, wherein said ratio is equal to $\frac{1}{2}$.

3. A joint as claimed in claim 1, wherein the needles of the bearings of the rollers have a length exceeding the length of the rollers.

4. A joint as claimed in claim 1, 2 or 3, wherein each arm has a shoulder and the raceways have a length which is such that, upon the extension of the joint, the rollers abut against the shoulder of the corresponding arms so that their sliding travel is inwardly limited before reaching an open end of said raceways.

5. A joint as claimed in claim 4, comprising a shock absorbing means disposed on each shoulder.

6. A transmission comprising two slidable homokinetic joints and a floating shaft interposed between said two joints, at least one of said joints comprising said tulip element which defines three raceways having a part-circular cross-sectional shape, a tripod element which has a cylindrical skirt portion fixing the tripod element to said shaft and three arms which extend radially from the skirt portion, three part-spherical rollers which are respectively freely rotatably and slidably mounted on the three arms, and a needle bearing interposed between each roller and the respective arm, each roller being received in a respective raceway of said raceways and the tripod element being axially free inside the tulip element, the raceways of the tulip element having the shape of a torus and the ratio of the maximum distance between the axis of the tulip element and the axis of the tori defining the raceways to the radius of said tori being between $\frac{1}{4}$ and $\frac{3}{4}$.

* * * * *